US008306496B2

(12) United States Patent
Shoji et al.

(10) Patent No.: US 8,306,496 B2
(45) Date of Patent: Nov. 6, 2012

(54) CHANNEL CHARACTERISTIC ANALYZING APPARATUS AND METHOD

(75) Inventors: Yozo Shoji, Koganei (JP); Hirokazu Sawada, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 347 days.

(21) Appl. No.: 12/312,485

(22) PCT Filed: May 10, 2007

(86) PCT No.: PCT/JP2007/059636
§ 371 (c)(1),
(2), (4) Date: Jan. 29, 2010

(87) PCT Pub. No.: WO2008/059629
PCT Pub. Date: May 22, 2008

(65) Prior Publication Data
US 2010/0130151 A1        May 27, 2010

(30) Foreign Application Priority Data

Nov. 14, 2006  (JP) ................................ 2006-308448

(51) Int. Cl.
*H04B 1/06* (2006.01)
(52) U.S. Cl. ........................................ 455/269; 455/108
(58) Field of Classification Search ....... 455/269–279.1, 455/108, 115.1–115.4, 562.1, 67.11–67.14, 455/296–307; 375/329, 148–149
See application file for complete search history.

(56) References Cited

U.S. PATENT DOCUMENTS

| 5,752,167 | A | 5/1998 | Kitayoshi |
| 7,164,932 | B1 | 1/2007 | Sato et al. |
| 7,406,337 | B2* | 7/2008 | Kim et al. ................. 455/276.1 |
| 7,885,228 | B2* | 2/2011 | Walton et al. .............. 455/562.1 |
| 2003/0022651 | A1* | 1/2003 | Bannasch et al. ............ 455/108 |
| 2005/0095987 | A1* | 5/2005 | Lyons et al. .............. 455/277.1 |
| 2006/0140310 | A1* | 6/2006 | Tashiro ........................ 375/329 |
| 2009/0186658 | A1* | 7/2009 | Jiang et al. ................. 455/562.1 |

FOREIGN PATENT DOCUMENTS

| JP | 8204590 | 8/1996 |
| JP | 2000165959 | 6/2000 |

OTHER PUBLICATIONS

Adel Saleh et al, "A Statistical Model for Indoor Multipath Propagation", IEEE Journal, vol. SAC-5, No. 2, Feb. 1987.
Quentin Spencer et al, "Modeling the Statistical Time and Angle of Arrival Characteristics of an Indoor Multipath Channel", IEEE Journal, vol. 18, No. 3, Mar. 2000.
Chia-Chin Chong et al, "A Generic Statistical-Based UWB Channel Model for High-Rise Apartments", IEEE Transactions on Antennas and Propagation, vol. 53, No. 8, Aug. 2005.

* cited by examiner

*Primary Examiner* — Lana N Le
(74) *Attorney, Agent, or Firm* — Jacobson Holman PLLC

(57) ABSTRACT

A channel characteristic analyzing apparatus that can ensure modeling of a more adequate propagation path by processing position parameters needed in a two-wave model which is used as a line-of-sight propagation path model in a stochastic manner is provided. The channel characteristic analyzing apparatus for analyzing the propagation channel characteristics of a reception apparatus 11*b* which has received a radio signal of a millimeter wave band, transmitted from a transmission antenna 13*a* of a transmission apparatus 11*a*, via a reception antenna 13*b*, includes computation means which computes h(t) expressed by the following equation (1) as a channel response to the propagation channel characteristic.

$$h(t) = \beta \delta(t) \qquad (1)$$

where $\beta$ is derived as a result of processing the position parameters needed also in the two-wave model in the stochastic manner.

12 Claims, 7 Drawing Sheets

CHANNEL CHARACTERISTIC ANALYZING APPARATUS AND METHOD

This is a national stage of PCT/JP07/059636 filed May 10, 2007 and published in Japanese, which has a priority of Japanese no. 2006-308448 filed Nov. 14, 2006, hereby incorporated by reference.

TECHNICAL FIELD

The present invention relates to an apparatus and method for generating channel characteristics in a radio communication system using a millimeter wave band in a pseudo manner.

BACKGROUND ART

Recently, wide-band transmission using a millimeter wave band is attracting attention as one way of transmitting broadband signals with high quality. Particularly, radio waves of the millimeter wave band (for example, 60 GHz) have short wavelengths, leading to possible miniaturization of apparatuses, and have the physical property such that the radio waves do not reach a far distance due to their large oxygen-originated absorption attenuation, so that interference is not likely to occur. For this reason, various modes of usage as radio communication systems which realize mass transmission at a low cost are expected.

A possible use mode of the radio communication system using the millimeter wave band in an office is a so-called short-distance desktop radio communication system in which terminal units, such as personal computers (PCs), are placed facing one another on a desk in a conference room or the like, and transmit and receive radio signals via antennas provided at the respective terminal units.

By the way, in such a short-distance desktop radio communication system, a radio signal transmitted from one terminal unit may be reflected at a wall, a ceiling or the like to be received by other terminal units. Especially, a radio signal may be reflected multiple times at walls or a ceiling to be received by other terminal units. That is, the propagation paths from one terminal unit to the other terminal units become a so-called multipath (multiplex transmission path), which deteriorates the transmission quality, may eventually cause a data error. When designing those short-distance desktop radio communication systems, therefore, modeling of adequate propagation paths becomes essential.

Conventionally, various studies have been made on modeling of propagation paths especially in consideration of a multipath. For example, Non-patent Document 1 proposes an SV (Saleh-Valenzuela) model on the assumption of the use of a non-directional antenna and over-the-horizon communication. In addition, with regard to this SV model, there have been proposed a model which has an angular dispersion parameter of a delayed wave added as disclosed in, for example, Non-patent Document 2, and a model which extracts the dispersion state of the amplitude of a delayed wave as a parameter as disclosed in Non-patent Document 3.
Non-patent Document 1: Adel A. M. Saleh, Reinaldo A. Valenzuela, IEEE Journal on selected areas in communications. Vol. SAC-5, No. 2, February 1987.
Non-patent Document 2: Quentin H. Spencer, Brian D. Jeffs, etc., IEEE Journal on selected areas in communications. Vol. 18, No. 3, March 2000
Non-patent Document 3: Chia-Chin Chong, Su Khiong Yong, IEEE Transactions on Antennas and Propagation, Vol. 53, No. 8, August 2005

DISCLOSURE OF THE INVENTION

Problems to be Solved by the Invention

By the way, a two-wave model using the direct wave between terminal units and a 1-time reflected wave on a desk, rather than the conventional over-the-horizon multipath propagation path model premised on the use of a comparatively low frequency band, such as microwave, becomes dominant in the propagation path characteristic at the time of carrying out radio communication between terminal units placed, facing one another, on a desk using a millimeter wave. This makes it necessary to realize modeling of a propagation path which reflects the two-wave model mainly.

It is normally difficult to identify the number of radio signals to be received by other terminal units and the times of arrival thereof in the over-the-horizon multipath propagation path model, and a scheme of processing these parameters stochastically is generally adopted due to the presence of uncertainties about these parameters. It is also known that the channel response obtained with the propagation path model processed stochastically matches well with an actual one.

On the other hand, in the line-of-sight propagation path model applied to radio communication or the like between terminal units placed, facing one another, on a desk, conventionally, it is considered sufficient to handle a radio signal transmitted and received between terminal units as one wave, and deal with the amplitude response as a fixed response.

However, it is known that in the millimeter wave band, especially, the channel response considerably changes with a slight change in the position of a communication terminal due to the short wavelength. Accordingly, in designing a radio communication system of the millimeter wave band whose ad hoc use is expected especially, i.e., in designing a radio communication system of the millimeter wave band in which the mutual installation positions of communication terminals are undefined beforehand, it is necessary to stochastically process position parameters needed within the two-wave model used as a line-of-sight propagation path model, and likewise stochastically deal with the channel response that is obtained by introduction of uncertainties.

Accordingly, it is an object of the present invention to provide a propagation path simulator or emulator which handles position parameters needed in a two-wave model which is used as a line-of-sight propagation path model to ensure modeling of a more adequate millimeter wave propagation path in order to realize a data transmission characteristic analysis in consideration of the propagation channel characteristic when a reception apparatus receives the radio signal of a millimeter wave band, transmitted from a transmission antenna of a transmission apparatus, via a reception antenna.

A data transmission characteristic analysis apparatus according to claim 1, which takes into consideration a propagation channel characteristic when a reception apparatus receives a radio signal of a millimeter wave band, transmitted from a transmission antenna of a transmission apparatus, via a reception antenna, is characterized by comprising:

computation means that computes h(t) expressed by the following equation (1) as a channel response to the propagation channel characteristic $$h(t) = \beta \delta(t) \tag{1}$$

where β is a complex amplitude expressed by the following equation (2), and δ(t) is a Dirac's delta function.

$$\beta = \sqrt{\frac{1}{P_{loss}}} \left(\frac{\mu_D}{D}\right) \left| \sqrt{G_{t1}G_{r1}} + \sqrt{G_{t2}G_{r2}} \, \Gamma_0 \exp\left[j\frac{2\pi}{\lambda_f}\frac{2h_1h_2}{D}\right] \right| \quad (2)$$

where
$G_{ti}$: gain of the transmission antenna in the transmission apparatus (i=1; direct wave, i=2; reflected wave)
$G_{ri}$: gain of the reception antenna in the reception apparatus (i=1; direct wave, i=2; reflected wave)
D: distance between a transmission antenna and a reception antenna at a time of generating of a channel response
$\mu_D$: average value of D
$h_1$: height of the transmission antenna
$h_2$: height of the reception antenna
$P_{loss}$: path loss in free space
$\Gamma_0$: complex reflection coefficient
$\lambda_f$: wavelength of the radio signal
and
D, $h_1$, and $h_2$ are respectively handled as mutually independent random variables according to a uniform distribution or a normal distribution, and parameters, such as a distribution range, a center value, an average, and dispersion, are determined based on a usage mode of a target radio communication system.

The data transmission characteristic analysis apparatus according to claim 2 is the invention according to claim 1, characterized in that the computation means computes h(t) expressed by the following equation (3) as a channel response to a propagation channel characteristic $$h(t) = \beta\delta(t) + \sum_{l=0}^{L-1}\sum_{m=0}^{M_l-1} \alpha_{l,m}\delta(t - T_l - \tau_{l,m})\delta(\varphi - \Psi_l - \psi_{l,m}) \quad (3)$$

where $\overline{|\alpha_{l,m}|^2} = \Omega_0 e^{-\tau_{l,m}/\gamma - k[1-\delta(m)]}\sqrt{G_r(0, \Psi_l + \psi_{l,m})}$, $\angle\alpha_{l,m} \propto$ Uniform $[0, 2\pi)$ where
l: l-th cluster
m: m-th delayed wave in the l-th cluster
L: total number of clusters
$M_l$: total number of delayed waves in the l-th cluster
$T_l$: time of arrival of the first delayed wave in the l-th cluster from the transmission apparatus to the reception apparatus
$\tau_{l,m}$: relative time delay of the m-th delayed wave in the l-th cluster with respect to $T_l$
$\Omega_0$: average value of a signal strength of the first delayed wave in the l-th cluster
$\Psi_l$: arrival angle of the first delayed wave in the l-th cluster (which takes any value in a range of 0 to 2π at a probability of a uniform distribution) at the reception antenna
$\psi_{l,m}$: relative arrival angle of the m-th delayed wave in the l-th cluster at the reception antenna with respect to $\Psi_l$
Γ: attenuation coefficient of a cluster
γ: attenuation coefficient of a delayed wave
k: coefficient expressing a Rician factor in each cluster
$\sqrt{G_r(0,\Psi_l+\psi_{l,m})}$: gain on a horizontal plane of the reception antenna $\angle\alpha_{l,m}\propto$Uniform$[0,2\pi)$:/$\alpha_{l,m}$|
$\angle\alpha_{l,m}$ takes any value in the range of 0 to 2π at the probability of a uniform distribution.

A channel characteristic analysis apparatus according to claim 3 is a data transmission characteristic analysis apparatus, which takes into consideration a propagation channel characteristic when a reception apparatus receives a radio signal of a millimeter wave band, transmitted from a transmission antenna of a transmission apparatus, via a reception antenna, and is characterized by comprising: computation means that computes h(t) expressed by the following equation (4) as a channel response to the propagation channel characteristic $$h(t) = \frac{\lambda_f}{4\pi d_1}\sqrt{G_{t1}G_{r1}}\,e^{-j\frac{2\pi}{\lambda_f}d_1}\delta(t) + \frac{\lambda_f}{4\pi d_2}\sqrt{G_{t2}G_{r2}}\,\Gamma_0 e^{-j\frac{2\pi}{\lambda_f}d_2}\delta(t-\Delta t) \quad (4)$$

Where $d_1 = \sqrt{(h_1 - h_2)^2 + D^2}$, $d_2 = \sqrt{(h_1 + h_2)^2 + D^2}$ where
$G_{ti}$: gain of the transmission antenna in the transmission apparatus (i=1; direct wave, i=2; reflected wave)
$G_{ri}$: gain of the reception antenna in the reception apparatus (i=1; direct wave, i=2; reflected wave)
D: distance between a transmission antenna and a reception antenna at a time of generating a channel response
$\mu_D$: average value of D
$h_1$: height of the transmission antenna
$h_2$: height of the reception antenna
$\Gamma_0$: complex reflection coefficient
$\lambda_f$: wavelength of the radio signal
k: coefficient expressing a Rician factor in each cluster
and
D, $h_1$, and $h_2$ are respectively handled as mutually independent random variables according to a uniform distribution or a normal distribution, and parameters, such as a distribution range, a center value, an average, and dispersion, are determined based on a usage mode of a target radio communication system.

A millimeter-wave radio communication system according to claim 4 is characterized in that a physical configuration or software-based control mechanism of the transmission apparatus or the reception apparatus is adjusted or designed based on a result of computation performed by the subject matter according to any one of the first to third inventions of Claims 1 to 3.

A channel characteristic analysis method according to claim 5 is a data transmission characteristic analysis method, which takes into consideration a propagation channel characteristic when a reception apparatus receives a radio signal of a millimeter wave band, transmitted from a transmission antenna of a transmission apparatus, via a reception antenna, is characterized by comprising: a computation step of computing h(t) expressed by the following equation (1) as a channel response to the propagation channel characteristic $$h(t)=\beta\delta(t) \quad (1)$$

where β is a complex amplitude expressed by the following equation (2), and δ(t) is a Dirac's delta function.

$$\beta = \sqrt{\frac{1}{P_{loss}}} \left(\frac{\mu_D}{D}\right) \left| \sqrt{G_{t1}G_{r1}} + \sqrt{G_{t2}G_{r2}} \, \Gamma_0 \exp\left[j\frac{2\pi}{\lambda_f}\frac{2h_1h_2}{D}\right] \right| \quad (2)$$

where
$G_{ti}$: gain of the transmission antenna in the transmission apparatus (i=1; direct wave, i=2; reflected wave)
$G_{ri}$: gain of the reception antenna in the reception apparatus (i=1; direct wave, i=2; reflected wave)
D: distance between a transmission antenna and a reception antenna at a time of generating of a channel response
$\mu_D$: average value of D
$h_1$: height of the transmission antenna
$h_2$: height of the reception antenna
$P_{loss}$: path loss in free space
$\Gamma_0$: complex reflection coefficient
$\lambda_f$: wavelength of the radio signal
and
D, $h_1$, and $h_2$ are respectively handled as mutually independent random variables according to a uniform distribution or a normal distribution, and parameters, such as a distribution range, a center value, an average, and dispersion, are determined based on a usage mode of a target radio communication system.

The data transmission characteristic analysis method according to claim 6 is the invention according to claim 5, which is characterized in that in the computation step, h(t) expressed by the following equation (3) is computed as a channel response to a propagation channel characteristic $$h(t) = \beta\delta(t) + \sum_{l=0}^{L-1}\sum_{m=0}^{M_l-1} \alpha_{l,m}\delta(t - T_l - \tau_{l,m})\delta(\varphi - \Psi_l - \psi_{l,m}) \quad (3)$$

where $$|\alpha_{l,m}|^2 = \Omega_0 e^{-T_l/\Gamma} e^{-\tau_{l,m}/\gamma - k[1-\delta(m)]}\sqrt{G_r(0, \Psi_l + \psi_{l,m})},$$

$\angle\alpha_{l,m} \propto \text{Uniform}[0, 2\pi)$ where
l: l-th cluster
m: m-th delayed wave in the l-th cluster
L: total number of clusters
$M_l$: total number of delayed waves in the l-th cluster
$T_l$: time of arrival of the first delayed wave in the l-th cluster from the transmission apparatus to the reception apparatus
$\tau_{l,m}$: relative time delay of the m-th delayed wave in the l-th cluster with respect to $T_l$
$\Omega_0$: average value of a signal strength of the first delayed wave in the l-th cluster
$\Psi_l$: arrival angle of the first delayed wave in the l-th cluster (which takes any value in a range of 0 to $2\pi$ at a probability of a uniform distribution) at the reception antenna
$\psi_{l,m}$: relative arrival angle of the m-th delayed wave in the l-th cluster at the reception antenna with respect to $\Psi_l$
$\Gamma$: attenuation coefficient of a cluster
$\gamma$: attenuation coefficient of a delayed wave
k: coefficient expressing a Rician factor in each cluster
$\sqrt{G_r(0,\Psi_l+\psi_{l,m})}$: gain on a horizontal plane of the reception antenna $\angle\alpha_{l,m}\propto\text{Uniform}[0,2\pi):/\alpha_{l,m}]$
  $\angle\alpha_{l,m}$ takes any value in the range of 0 to $2\pi$ at the probability of a uniform distribution.

A data transmission characteristic analysis method according to claim 7, which takes into consideration a propagation channel characteristic when a reception apparatus receives a radio signal of a millimeter wave band, transmitted from a transmission antenna of a transmission apparatus, via a reception antenna, is characterized by comprising: a computation step of computing h(t) expressed by the following equation (4) as a channel response to the propagation channel characteristic $$h(t) = \frac{\lambda_f}{4\pi d_1}\sqrt{G_{t1}G_{r1}}\, e^{-j\frac{2\pi}{\lambda_f}d_1}\delta(t) + \frac{\lambda_f}{4\pi d_2}\sqrt{G_{t2}G_{r2}}\,\Gamma_0 e^{-j\frac{2\pi}{\lambda_f}d_2}\delta(t-\Delta t) \quad (4)$$

Where $d_1 = \sqrt{(h_1-h_2)^2 + D^2}$, $d_2 = \sqrt{(h_1+h_2)^2 + D^2}$ $G_{ti}$: gain of the transmission antenna in the transmission apparatus (i=1; direct wave, i=2; reflected wave)
$G_{ri}$: gain of the reception antenna in the reception apparatus (i=1; direct wave, i=2; reflected wave)
D: distance between a transmission antenna and a reception antenna at a time of generating of a channel response
$\mu_D$: average value of D
$h_1$: height of the transmission antenna
$h_2$: height of the reception antenna
$\Gamma_0$: complex reflection coefficient
$\lambda_f$: wavelength of the radio signal
k: coefficient expressing a Rician factor in each cluster
and
D, $h_1$, and $h_2$ are respectively handled as mutually independent random variables according to a uniform distribution or a normal distribution, and parameters, such as a distribution range, a center value, an average, and dispersion, are determined based on a usage mode of a target radio communication system.

A program according to claim 8, which allows a computer to execute simulation or emulation of a propagation channel characteristic when a reception apparatus receives a radio signal of a millimeter wave band, transmitted from a transmission antenna of a transmission apparatus, via a reception antenna, allows the computer to execute: a computation step of computing h(t) expressed by the following equation (1) as a channel response to the propagation channel characteristic $$h(t) = \beta\delta(t) \quad (1)$$

where $\beta$ is a complex amplitude expressed by the following equation (2), and $\delta(t)$ is a Dirac's delta function.

$$\beta = \sqrt{\frac{1}{P_{loss}}}\left(\frac{\mu_D}{D}\right)\left|\sqrt{G_{t1}G_{r1}} + \sqrt{G_{t2}G_{r2}}\,\Gamma_0\exp\left[j\frac{2\pi}{\lambda_f}\frac{2h_1h_2}{D}\right]\right| \quad (2)$$

where
$G_{ti}$: gain of the transmission antenna in the transmission apparatus (i=1; direct wave, i=2; reflected wave)
$G_{ri}$: gain of the reception antenna in the reception apparatus (i=1; direct wave, i=2; reflected wave)
D: distance between a transmission antenna and a reception antenna at a time of generating of a channel response
$\mu_D$: average value of D
$h_1$: height of the transmission antenna
$h_2$: height of the reception antenna
$P_{loss}$: path loss in free space
$\Gamma_0$: complex reflection coefficient
$\lambda_f$: wavelength of the radio signal
and
D, $h_1$, and $h_2$ are respectively handled as mutually independent random variables according to a uniform distribution or a normal distribution, and parameters, such as a distribution range, a center value, an average, and dispersion, are determined based on a usage mode of a target radio communication system.

The program according to claim 9 is the invention according to claim 8, which is characterized in that in the computation step, h(t) expressed by the following equation (3) is computed as a channel response to a propagation channel characteristic $$h(t) = \beta\delta(t) + \sum_{l=0}^{L-1}\sum_{m=0}^{M_l-1} \alpha_{l,m}\delta(t-T_l-\tau_{l,m})\delta(\varphi-\Psi_l-\psi_{l,m}) \quad (3)$$

where $$\overline{|\alpha_{l,m}|^2} = \Omega_0 e^{-T_l/\Gamma} e^{-\tau_{l,m}/\gamma - k[1-\delta(m)]} \sqrt{G_r(0, \Psi_l + \psi_{l,m})},$$

$$\angle \alpha_{l,m} \propto \text{Uniform }[0, 2\pi)$$

where
l: l-th cluster
m: m-th delayed wave in the l-th cluster
L: total number of clusters
$M_l$: total number of delayed waves in the l-th cluster
$T_l$: time of arrival of the first delayed wave in the l-th cluster from the transmission apparatus to the reception apparatus
$\tau_{l,m}$: relative time delay of the m-th delayed wave in the l-th cluster with respect to $T_l$
$\Omega_0$: average value of a signal strength of the first delayed wave in the l-th cluster
$\Psi_l$: arrival angle of the first delayed wave in the l-th cluster (which takes any value in a range of 0 to $2\pi$ at a probability of a uniform distribution) at the reception antenna
$\psi_{l,m}$: relative arrival angle of the m-th delayed wave in the l-th cluster at the reception antenna with respect to $\Psi_l$
$\Gamma$: attenuation coefficient of a cluster
$\gamma$: attenuation coefficient of a delayed wave
k: coefficient expressing a Rician factor in each cluster
$\sqrt{G_r(0,\Psi_l+\psi_{l,m})}$: gain on a horizontal plane of the reception antenna $\angle \alpha_{l,m} \propto \text{Uniform}[0,2\pi)/\alpha_{l,m}$
$\angle \alpha_{l,m}$ takes any value in the range of 0 to $2\pi$ at the probability of a uniform distribution.

A program according to claim 10, which allows a computer to execute simulation or emulation of a propagation channel characteristic when a reception apparatus receives a radio signal of a millimeter wave band, transmitted from a transmission antenna of a transmission apparatus, via a reception antenna, allows the computer to execute: a computation step of computing h(t) expressed by the following equation (4) as a channel response to the propagation channel characteristic $$h(t) = \frac{\lambda_f}{4\pi d_1}\sqrt{G_{t1}G_{r1}}\, e^{-j\frac{2\pi}{\lambda_j}d_1}\delta(t) + \frac{\lambda_f}{4\pi d_2}\sqrt{G_{t2}G_{r2}}\,\Gamma_0 e^{-j\frac{2\pi}{\lambda_j}d_2}\delta(t-\Delta t). \quad (4)$$

Where $$d_1 = \sqrt{(h_1-h_2)^2 + D^2},$$

$$d_2 = \sqrt{(h_1+h_2)^2 + D^2}$$

$G_{ti}$: gain of the transmission antenna in the transmission apparatus (i=1; direct wave, i=2; reflected wave)
$G_{ri}$: gain of the reception antenna in the reception apparatus (i=1; direct wave, i=2; reflected wave)
D: distance between a transmission antenna and a reception antenna at a time of generating of a channel response $\mu_D$: average value of D
$h_1$: height of the transmission antenna
$h_2$: height of the reception antenna
$\Gamma_0$: complex reflection coefficient
$\lambda_f$: wavelength of the radio signal
k: coefficient expressing a Rician factor in each cluster
and
D, $h_1$, and $h_2$ are respectively handled as mutually independent random variables according to a uniform distribution or a normal distribution, and parameters, such as a distribution range, a center value, an average, and dispersion, are determined based on a usage mode of a target radio communication system.

A recording medium according to claim 11 is characterized by recording the program according to any one of claims 8 to 10.

Effect of the Invention

According to the invention with the foregoing configuration, position parameters needed in a two-wave model which is used as a line-of-sight propagation path model can be handled as random variables, thus ensuring more appropriate modeling of a propagation path.

BEST MODE FOR CARRYING OUT THE INVENTION

A data transmission characteristic analysis apparatus which takes into consideration the channel characteristic in a radio communication system using a millimeter wave band, as the best mode for carrying out the invention, is described below in detail referring to the accompanying drawings.

A data transmission characteristic analysis apparatus according to the invention is used to analyze data transmission characteristics in a short-distance desktop radio communication system 1 as shown in, for example, FIG. 1(a). The short-distance desktop radio communication system 1 is a system in which a plurality of terminal units 11, such as personal computers (PCs) of a notebook type, are placed, facing one another, on a desk 12 in a conference room or the like, and transmit and receive radio signals via antennas provided at the individual terminal units 11.

Since this short-distance desktop radio communication system 1 enables communications if at least two terminal units 11 are present, the following describes a short-distance desktop radio communication system 1a which carries out radio communications between a transmission apparatus 11a as the terminal unit 11, and the transmission apparatus 11b as the terminal unit 11, as shown in FIG. 1(b).

In this short-distance desktop radio communication system 1a, a radio signal of a millimeter wave band is transmitted from a transmission antenna 13a of the transmission apparatus 11a, and the reception apparatus 11b receives this radio signal via a reception antenna 13b.

In carrying out radio communication between the transmission apparatus 11a and the reception apparatus 11b which have the above configuration, as shown in FIG. 1(b), for example, there are a direct wave directly transmitted from the antenna 13a to the antenna 13b, and a reflected wave which is the radio signal sent from the antenna 13a that is reflected on the desk 12 once, and received at the antenna 13b. Further, there also is a case where a so-called multipath wave, which is the radio signal transmitted from the transmission apparatus 11a that is reflected at a wall and a ceiling or the like multiple times, be received by the reception apparatus 11b via the antenna 13b.

Paying attention to the fact that in the data transmission characteristic analysis apparatus to which the invention is applied, the influence of the line-of-sight waves, such as the direct wave and the reflected wave, is reflected mainly on the propagation channel characteristic in the short-distance desktop radio communication system 1, position parameters needed within a two-wave model used as such a line-of-sight wave propagation path model are processed as random variables. The data transmission characteristic analysis apparatus to which the invention is applied is adopted as a hardware configuration, such as a PC which stores a program for performing the propagation characteristic simulation or emulation to be explained below.

FIG. 2 shows a hardware configuration 5 (emulator) of a propagation path simulator to which the invention is applied. In this hardware configuration 5, a ROM (Read Only Memory) 22, a RAM (Random Access Memory) 23 as a work area to be used for storage, expansion, etc. of data, a CPU (Central Processing Unit) 24 for controlling a whole terminal unit 3, an operation section 25 for inputting various control instructions via operational buttons, a keyboard, etc., a display control section 16 for controlling display of various kinds of information, and a storage section 27, which is typified by a hard disk and stores a program for performing search to be executed, are connected to an internal bus 21. The internal bus 21 is also connected with a communication I/F 28. A plurality of terminals for inputting and outputting data are connected to the communication I/F 28. A display section 26 as a monitor to actually display information is connected to the display control section 16.

A program for controlling hardware resources is stored in the ROM 22. A storage medium, such as EEPROM (Electronically Erasable and Programmable Read Only Memory), may be used in place of the ROM 22.

The RAM 23 temporarily stores various commands for controlling hardware resources. A storage medium, such as the EEPROM or a CD-R/RW, may be used in place of the RAM 23.

The CPU 24 is a so-called central processing unit for controlling individual components installed in the propagation path simulator 5 by transmitting control signals via the internal bus 21. The CPU 24 transmits various control instructions via the internal bus 21 according to a user's operation made through the operation section 25.

The operation section 25 is embodied by a mouse, a keyboard and the like, and an execution instruction for executing the program is inputted to the operation section 25 by the user. When the execution instruction is inputted by the user, the operation section 25 notifies the CPU 24 of that input. Upon reception of the notification, the CPU 24 reads the program from the storage section 27, and executes it.

The display control section 16 is constituted by a graphic controller which creates a display image under the control of the CPU 24. The display section 26 connected to the display control section 16 is realized by a liquid crystal display (LCD) or the like, for example.

In the case where the storage section 27 comprises a hard disk, predetermined information is written therein at each address under the control of the CPU 24, and the information is read out as needed. The program for implementing the invention is stored in the storage section 27. This program is read and executed by the CPU 24.

The communication I/F 28 normally has an input port and an output port. The propagation path simulator 5 is designed in such a way that when an ideal impulse signal δ(t) is given to the input port as an input signal, h(t) is obtained from the output port as its output. When a general signal s(t) is given as an input signal at this time, s(t)*h(t) (* represents convolution integration) which is h(t) subjected to convolution integration with s(t) as a transfer function is obtained from the output port.

Hereafter, the analysis method which is executed by the data transmission characteristic analysis apparatus to which the invention is applied is explained.

First, h(t) expressed by the following equation (1) is computed as a channel response between the transmission antenna 13a and the reception antenna 13b. The computation function is carried out by the CPU 24 in FIG. 2, for example.

$$h(t) = \beta \delta(t) \quad (1)$$

where β is a complex amplitude expressed by the following equation (2), and δ(t) is a Dirac's delta function.

$$\beta = \sqrt{\frac{1}{P_{loss}}} \left(\frac{\mu_D}{D}\right) \left| \sqrt{G_{t1} G_{r1}} + \sqrt{G_{t2} G_{r2}} \, \Gamma_0 \exp\left[ j \frac{2\pi}{\lambda_f} \frac{2h_1 h_2}{D} \right] \right| \quad (2)$$

where
$G_{ti}$: gain of the transmission antenna 13a in the transmission apparatus 11a (i=1; direct wave, i=2; reflected wave)
$G_{ri}$: gain of the reception antenna 13b in the reception apparatus 11b (i=1; direct wave, i=2; reflected wave)
D: distance between a transmission antenna and a reception antenna at the time of generating of a channel response
$\mu_D$: average value of D
$h_1$: height of the transmission antenna 13a
$h_2$: height of the reception antenna 13b
$P_{loss}$: path loss in free space
$\Gamma_0$: complex reflection coefficient
$\lambda_f$: wavelength of the radio signal D is acquired every time a channel response is generated. D is a parameter which may be changed whenever the user who uses the transmission apparatus 11a and the reception apparatus 11b reinstalls them. That is, D is assumed to differ whenever communication is carried out. Therefore, it is assumed that a different D is used whenever a channel response is generated. It is likewise assumed that $h_1$ and $h_2$ may differ whenever communication is carried out.

On the other hand, $\mu_D$ is an average value of D which is assumed to vary. If D is a uniform distribution, the $\mu_D$ becomes the center value of the changing range of D.

Namely, it is assumed that the position of the reception apparatus 11b to the transmission apparatus 11a is in a fixed uncertainty range, the amplitude value of the channel response of the two-wave model which consists of a direct wave and a wave reflected on a desk can be set so as to follow the stochastic statistical distribution by assuming that the position parameter, D, $h_1$, and $h_2$ of an antenna are changed probable as mentioned above and by applying this to the equation (2). The communication quality can be estimated by estimating the probability that the output amplitude value falls below a certain threshold, i.e., the probability that communication is disabled, based on this principle.

Given that the height of the transmission antenna 13a is set to $h_1$, and the height of the reception antenna 13b is set to $h_2$ and also the distance between the transmission apparatus 11a and the reception apparatus 11b is set to D, for example, as shown in FIG. 3, $h_1$ can be assumed to be a uniform distribution in the range of $h_1 \pm \Delta h$, $h_2$ can be assumed to be a uniform distribution in the range of $h_2 \pm \Delta h$, and further D can be assumed to be a uniform distribution in the range of $D \pm \Delta D$. This assumes that the relative positional relationship of the reception antenna 13b with respect to the transmission antenna 13a changes within the limit of ±ΔD and ±Δh.

At this time, the stochastic distribution of the channel response β by the two-wave model of the direct wave and the reflected wave is expressed by the equation (2).

Namely, in the data transmission characteristic analysis apparatus to which the invention is applied, assuming the distribution of the relative positional relationship between terminals makes it possible to acquire the distribution of a channel response, for example, by using the equation (2), and this distribution can be obtained as the analysis result. Since the analysis result is stochastically processed for a position parameter needed within the two-wave model used as a line-of-sight propagation path model, it can be very useful information in designing the short-distance desktop radio communication system 1 which is expected to be used especially in an ad hoc manner, i.e., designing the short-distance desktop radio communication system 1 of the millimeter wave band in which the mutual installation positions of communication terminals are undefined beforehand. For example, it is possible to estimate the numerical values indicating at what probability communication will be disabled at which location of the reception apparatus 11b the reception antenna 13b is to be installed and at which communication distance D it is used.

Since especially the millimeter wave band has a very short wavelength, a slight change in the position of the reception apparatus 11b on the desk 12 changes the channel response considerably. In the radio communication system of such a millimeter wave band, introducing random variables which becomes a uniform distribution as shown in FIG. 3 as the positional variables of the antennas 13a and 13b can allow the amplitude coefficient β to be expressed as a random variable on which it is reflected, thus making it possible to output useful information reflecting a slightly varying channel response peculiar to the millimeter wave band.

D, $h_1$, and $h_2$ may follow normal distributions independent of one another.

It is to be noted that parameters, such as ranges of the uniform distributions which those D, $h_1$, and $h_2$ should follow, and the normal distribution, the center value, an average value, and dispersion, shall be determined based on the use mode of the target short-distance desktop radio communication system 1.

It is natural that D, $h_1$, and $h_2$ are given in a uniform distribution or a normal distribution. For example, the following assumption of the system use mode and how to give the parameters can be considered.

If communication is carried out between the transmission apparatus 11a and the reception apparatus 11b placed on the desk 12 at a distance of 1 m therebetween as a use mode of the short-distance desktop radio communication system 1, the distribution range of the transmission distance is set to about ±15 cm plus 1 m in consideration of the uncertainty of the installation range on the desk 12 of the user who uses them. It is assumed that the transmission antenna 13a and the reception antenna 13b are placed at the back of the display, and the distribution range is set to about ±5 cm plus a height of 15 cm from the desk in consideration of the range of a change in the height. Apparently, with the use mode of the short-distance target desktop radio communication system 1 and the installation positions of the transmission antenna 13a and the reception antenna 13b taken into consideration, parameters, such as the distribution ranges of the position parameters of the antennas in use, the center value, the average value, and the dispersion, can be assumed.

In the above-described example, the following approach is considered as a concrete method when position parameters are given in each distribution.

First, 1) an example of how to give the parameters when a uniform distribution is applied $h_1 \propto 0.15 + \text{Uniform}\ [-0.05\ 0.05]$ $h_2 \propto 0.15 + \text{Uniform}\ [-0.05\ 0.05]$ $D \propto 1 + \text{Uniform}\ [-0.15\ 0.15]$ 2) An example of how to give the parameters when a normal distribution is applied $h_1 \propto \text{Normal}(h_1, 0.15, 0.05)$ $h_2 \propto \text{Normal}(h_2, 0.15, 0.05)$ $D \propto \text{Normal}(D, 0.15, 0.05)$ $$\text{Normal}(x, \mu, \sigma) = \frac{1}{\sqrt{2\pi\sigma^2}} \exp\left(-\frac{(x-\mu)^2}{2\sigma^2}\right)$$

Provided that

In the data transmission characteristic analysis apparatus to which the invention is applied, h(t) may be computed in consideration of the influence of a multipath wave in addition to the two-wave model. An equation (3) is an equation of the propagation model that is the two-wave model combined with an SV (Saleh-Valenzuela) model which takes the influence by a multipath wave into account. The equation (3) consists of a first term of the two-wave model which includes βδ(t), and a second term of the SV model.

$$h(t) = \beta \delta(t) + \sum_{l=0}^{L-1} \sum_{m=0}^{M_l - 1} \alpha_{l,m} \delta(t - T_l - \tau_{l,m}) \delta(\varphi - \Psi_l - \psi_{l,m}) \quad (3)$$

where $\overline{|\alpha_{l,m}|^2} = \Omega_0 e^{-T_l/\Gamma} e^{-\tau_{l,m}/\gamma - k[1-\delta(m)]} \sqrt{G_r(0, \Psi_l + \psi_{l,m})}$, $\angle \alpha_{l,m} \propto \text{Uniform}[0, 2\pi)$ where
l: l-th cluster
m: m-th delayed wave in the l-th cluster
L: total number of clusters
$M_l$: total number of delayed waves in the l-th cluster
$T_l$: time of arrival of the first delayed wave in the l-th cluster from the transmission apparatus to the reception apparatus
$\tau_{l,m}$: relative time delay of the m-th delayed wave in the l-th cluster with respect to $T_l$
$\Omega_0$: average value of a signal strength of the first delayed wave in the l-th cluster
$\Psi_l$: arrival angle of the first delayed wave in the l-th cluster (which takes any value in a range of 0 to 2π at a probability of a uniform distribution) at the reception antenna
$\psi_{l,m}$: relative arrival angle of the m-th delayed wave in the l-th cluster at the reception antenna with respect to $\Psi_l$
Γ: attenuation coefficient of a cluster
γ: attenuation coefficient of a delayed wave
k: Rician factor which represents the difference between the first delayed wave and the second delayed wave in each cluster. The introduction of this coefficient can allow a channel response to be generated to approach an actual measured value.

$\sqrt{G_r(0,\Psi_l+\psi_{l,m})}$: gain on a horizontal plane of the reception antenna $\angle\alpha_{l,m} \propto \text{Uniform}[0,2\pi):/\alpha_{l,m}]$ $\angle\alpha_{l,m}$ takes any value in the range of 0 to $2\pi$ at the probability of a uniform distribution.

The equation (3) can provide a useful solution especially in a case where the influence of a multipath should be taken into consideration not a little in addition to a line-of-sight wave. The parameters of $\Psi_l$ and $\Psi_{l,m}$ are introduced in the equation (3) on the assumption of the case of using the directional antenna for which the angle of arrival at the reception antenna 13b matters, and for the purpose of considering the angle of incidence of the received radio signal to the reception antenna 13b three-dimensionally and reflecting it on the analysis result. The angle of arrival of the delayed wave at the reception antenna 13b (AoA: Angle of Arrival) is assumed to be a uniform distribution in the range of 0 to $2\pi$.

That is, analysis using the equation (3) can provide an effective solution particularly when a directional antenna is used as the reception antenna 13b.

FIG. 4 is a conceptual diagram of the channel response characteristic expressed by the equation (3). In FIG. 4, the time of arrival is taken on the abscissa, and the time of reception of a line-of-sight wave is a reference time (t=0). The reception level is taken on the ordinate. At t=0, the peak of the reception level on which the random variable in term $\beta\delta(t)$ in the two-wave model is reflected appears, after which the peak of the reception level on which the random variable in the term of the SV model is reflected appears stepwisely. As shown in FIG. 4, the stepwise peak in the SV model has a series of clusters which form a group of pulse responses, and each cluster comprises delayed waves as a plurality of pulse responses.

FIG. 4 is a conceptual diagram of one example of the channel response, and shows the two-wave model has a very high peak as compared with the stepwise peaks of the SV model. This makes it clear that the two-wave model dominates the channel response characteristic.

It is also possible to examine the probability that the power of the direct wave component is less than a threshold, the ratio of the power ratio (K factor) of the line-of-sight wave to that of another multipath wave component is less than a threshold, etc., by using the equation of the channel response characteristic expressed with the equation (3). An equation (4) is an equation which reflects the peak of the two-wave model more strictly.

$$h(t) = \frac{\lambda_f}{4\pi d_1}\sqrt{G_{t1}G_{r1}}\, e^{-j\frac{2\pi}{\lambda_f}d_1}\delta(t) + \frac{\lambda_f}{4\pi d_2}\sqrt{G_{t2}G_{r2}}\,\Gamma_0 e^{-j\frac{2\pi}{\lambda_f}d_2}\delta(t-\Delta t) \quad (4)$$

Where $d_1 = \sqrt{(h_1-h_2)^2 + D^2}$, $d_2 = \sqrt{(h_1+h_2)^2 + D^2}$

The equation (4) makes it possible to strictly and accurately estimate the numerical values indicating at what probability communication will be disabled at which location of the reception apparatus 11b the reception antenna 13b is to be installed and at which communication distance D it is used.

Given that $\Delta t^*=0$, $D\gg h_1$, $h_2$, $h_1^*=h_2$, $G_{t1}^*=G_{r1}$, and $G_{t2}^*=G_{r2}$ in the equation (4), the equation can be simplified to the following equation (5).

$$\beta(t) = \sqrt{G_{t1}G_{r1}}\left|1 + \Gamma_l\exp\left[j\frac{2\pi}{\lambda_f}\frac{2h_1h_2}{D}\right]\right| \quad (5)$$

Further, if $G_{t1}$, $G_{r1}^*=1$ is assumed in consideration of only the response, the equation can be expressed as:

$$\beta(t) = \left|1 + \Gamma_l\exp\left[j\frac{2\pi}{\lambda_f}\frac{2h_1h_2}{D}\right]\right| \quad (6)$$

It is needless to say that the foregoing embodiment may be worked not only as a terminal unit where the program that executes the above-described analysis method is stored, but of course in the embodiment mentioned above, but also as the program itself or a recording medium where the program is recorded.

Furthermore, the data transmission characteristic analysis apparatus to which the invention is applied can execute a more effective analysis than the application of mobile communication in which the two-wave model component becomes dominant as a propagation characteristic. A car-to-car communication, for example, is a typical application of mobile communication which is to be analyzed. In the car-to-car communication, communication is carried out between two cars one of which follows the other, at which time radio communication is carried out between the antenna installed at the rear portion of the preceding car, and the antenna installed at the front portion of the following car.

There are two waves, namely the direct wave which propagates between the mutual antennas and the reflected wave which is reflected at the ground surface in such a radio communication system, and the radio communication takes place at a relatively low position. Therefore, the two-wave model becomes dominant in the communication using especially a line-of-sight and high-frequency wave. The channel response to this two-wave model is also based on the equations (1) to (4). That is, the vibration of the vehicles which execute communication and a change in the relative distance therebetween cause a change in the relative positional relation between the antennas which carry out transmission and reception according to the movement of vehicles from time to time. As a scheme of modeling it appropriately, it is possible to analyze a channel response in each communication attempted from the equations (1) to (4) and analyze and examine the data transmission characteristics on the assumption that the position parameters of antennas accord to a uniform distribution, a normal distribution, etc. Further, since it is assumed that communication terminals move over a wide range in an application field like car-to-car mobile communication, the reflection coefficient $\Gamma$ which dominates (1) to (4) changes with time, so that the channel response changes in a fine pitch. As this phenomenon is originated from the phase inversion of two interfering waves, it is obvious that the phenomenon occurs more sensitively as the radio frequency band to be used is a high frequency like a millimeter wave band, i.e., as the frequency is of a shorter wavelength. If the position of each antenna which varies according to the movement or vibration of a vehicle, and the reflection coefficient $\Gamma$ which changes from time to time can be expressed by a certain time function or a frequency function or the like through actual measurements or the like, they may be analyzed similarly with the data transmission characteristic analysis apparatus to which the invention is applied.

That is, in a case where the system should be designed based mainly on a statistical change in a relative position parameter with time in realizing mobile communication, it is particularly effective to adopt the data transmission characteristic analysis apparatus according to the invention.

Communication between PCs placed on a desk being deals with a channel change in a long term in semipermanent communication, whereas car-to-car communication differs from the former communication in that a channel change in a short term is dealt with. However, at the time of analyzing the channel response characteristic of the car-to-car communication, the distribution of position parameters can likewise be expressed by a uniform distribution or a normal distribution, and analysis can be carried out similarly using the equations (1) to (4) by showing a time-dependent change in $\Gamma$ as a function of time.

In addition to the use mentioned above, it does not matter to think that the state of the channel in a packet transmission period or a symbol transmission period is constant even in considering a broader band communication. This makes it possible to provide more useful analysis results using the use of the data transmission characteristic analysis apparatus to which the invention is applied.

EXAMPLE 1

Next, a description is given of an example of optimizing the transmission apparatus $11a$ and the reception apparatus $11b$ based on the solution computed by the data transmission characteristic analysis apparatus to which the invention is applied.

FIGS. 5 and 6 are graphs of a CDF (cumulative probability density function) of the reception level of a direct wave component effective in communication with the reception level in a line-of-sight communication state without any reflected wave being set to 0 dB. The CDF is computed based on the equation (2).

FIGS. 5 and 6 show a case where one reception antenna $13b$ is mounted (with no diversity), a case where the second reception antenna $13b$ is mounted and the CDF value with a high reception level is always used (selected diversity at two locations) and a case where the third reception antenna $13b$ is mounted and the CDF value with a high reception level is always used (selected diversity at three locations).

It is assumed that in the case of the selected diversity at two locations, the two reception antennas $13b$ are mounted separated from each other at a distance of 2 cm, whereas in the case of the selected diversity at three locations, two reception antennas $13b$ are mounted separated from each other at distances of 1 cm and 2.2 cm.

In the result in FIG. 5, the communication distance D of radio communication on the desk 12 is 1 m and the range of uncertainty is set to a uniform distribution of $\Delta D = \pm 15$ cm. $\Delta D = \pm 15$ cm is the assumed range in which the user who uses a notebook PC shifts the position. $h_1$ and $h_2$ are set to uniform distributions of 10 cm to 15 cm, respectively.

In the graph in FIG. 5, assuming that communication is disabled when the reception level is less than 0 dB, in the case of no diversity, communication is disabled at a probability of about 30 to 40%. By way of comparison, in the case of two-brunch selective diversity with the aforementioned antenna installation distance, the probability that the reception level falls below 0 dB can be improved to less than 0.5%. Further, in the case of three-brunch selective diversity with the aforementioned antenna installation distances, the probability that the reception level falls below 0 dB can be improved to less than 0.01%.

In the result in FIG. 6, the communication distance D of radio communication on the desk 12 is 2 m and the range of uncertainty is set to a uniform distribution of $\Delta D = \pm 15$ cm. $h_1$ and $h_2$ are set to uniform distributions of 10 cm to 15 cm, respectively.

In the graph in FIG. 6, assuming that communication is disabled when the reception level is less than 0 dB, in the case of no diversity, communication is disabled at a probability of about 30 to 40%. By way of comparison, in the case of two-brunch selective diversity with the aforementioned antenna installation distance, the probability that the reception level falls below 0 dB does not become less than 0.5% as in the example of FIG. 5, but can be improved to approximately 8%. Further, in the case of three-brunch selective diversity with the aforementioned antenna installation distances, the probability that the reception level falls below 0 dB can be improved to less than 0.01%.

The above analysis results show that high-quality communication can be carried out with a very high probability, provided that a uniform distribution of 1 m±15 cm to 2 m±15 cm can be assumed as the range of uncertainty for the communication distance D over which desktop communication is carried out, a uniform distribution of 10 to 15 cm with the antenna $13a$ of the transmission apparatus $11a$ having the height $h_1$ of 10 to 15 cm, and antennas are placed at three locations at intervals of 1 cm and 2.2 cm as selective diversity in the reception apparatus $13b$. Reflecting those solutions to the actual circuit designing of the transmission apparatus $11a$ and the reception apparatus $11b$ can improve the communication quality of the short-distance desktop radio communication system $1a$ itself.

EXAMPLE 2

As apparent from the equation (2), there is the relation between $\sqrt{G_{t1}G_{r1}}$ and $\sqrt{/G_{t2}G_{r2}}$ as an element which determines the size of the dynamic range of the channel response in the two-wave model. When $\sqrt{G_{t1}G_{r1}} = \sqrt{G_{t2}G_{r2}}$, and the phase term in the equation (2) becomes $\pi$, the first term and the second term are canceled out each other completely, so that the channel response amplitude $\beta$ approaches 0. That is, it means that the direct wave component is attenuated greatly.

Therefore, one possible way to avoid such a worst condition is such that upon detection of the attenuation of the direct wave component, one of the parameters $G_{t1}, G_{t2}, G_{r1},$ and $G_{r2}$ is changed actively to intentionally create the relation of $\sqrt{G_{t1}G_{r1}} \neq \sqrt{G_{t2}G_{r2}}$.

The following description is given of an example shown in FIG. 7. In FIG. 7, a receiving unit 4 is configured which comprises two reception antennas $13b\_1$ and $13b\_2$ which are arranged perpendicularly, a phase adjuster 41 connected to the reception antenna $13b\_1$, a demodulator circuit 42 connected to the phase adjuster 41 and the reception antenna $13b\_2$, and a detection circuit 43 connected to the demodulator circuit 42.

In the receiving unit 4, when the reception level becomes a given value or less, the phase before combination is adjusted using the phase adjuster 41. The amount of adjustment of the phase by the phase adjuster 41 is controlled by the detection circuit 43 which has detected the output signal from the demodulator circuit 42, or the composite signal from the antenna which is not shown in the diagram. This makes it possible to actively change one of the parameters $G_{t1}, G_{t2}, G_{r1},$ and $G_{r2}$.

That is, with the equation (2) standardized by the coefficient ($\mu_D$/D) to be a standardization amplitude response $\beta'$, in the state of $\sqrt{G_{t1}G_{r1}}$ and $\sqrt{G_{t2}G_{r2}}$, $\beta'$ can take a value of 0 to 2 according to the positional change of the transmission apparatus 11a or the reception apparatus 11b. That is, the dynamic range becomes infinite theoretically. On the assumption that the reception antenna gain of the wave reflected on the desk to the reception antenna gain of the direct wave can be reduced to ½ relatively, the response β' of the two-wave model can take a value of approximately 0.7 to 1.3, which shows that the dynamic range falls within about 5 to 6 dB. This can be considered as a circuit margin.

As channel characteristics obtained are considered based on the principle of the data transmission characteristic analysis apparatus according to the invention, and the above-mentioned control in use, the probability of disabling the communication as the foregoing examination results can be estimated.

Figure 1A:
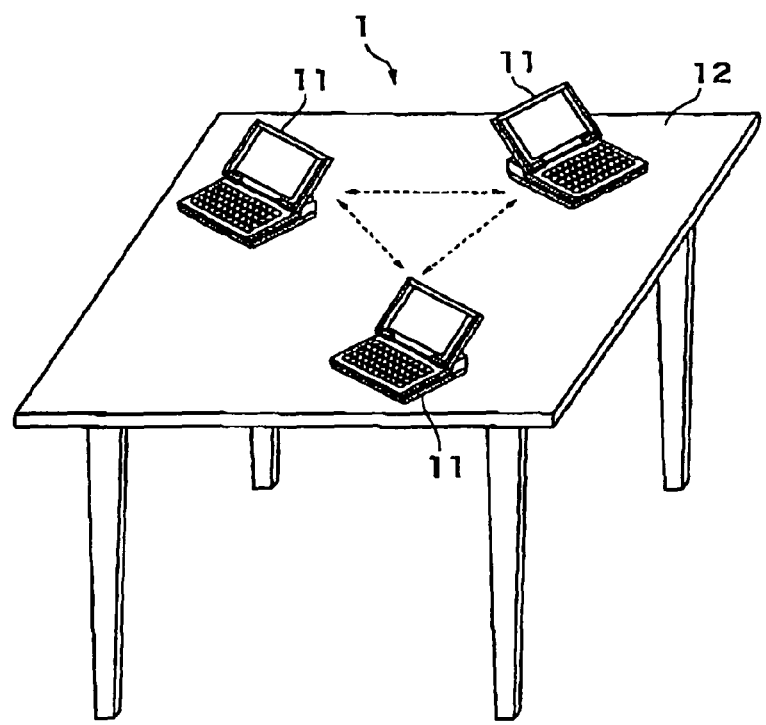
FIG. 1 This is a diagram for explaining a short-distance desktop radio communication system as a target whose propagation channel characteristic is analyzed by a data transmission characteristic analysis apparatus according to the invention.
Figure 1B:
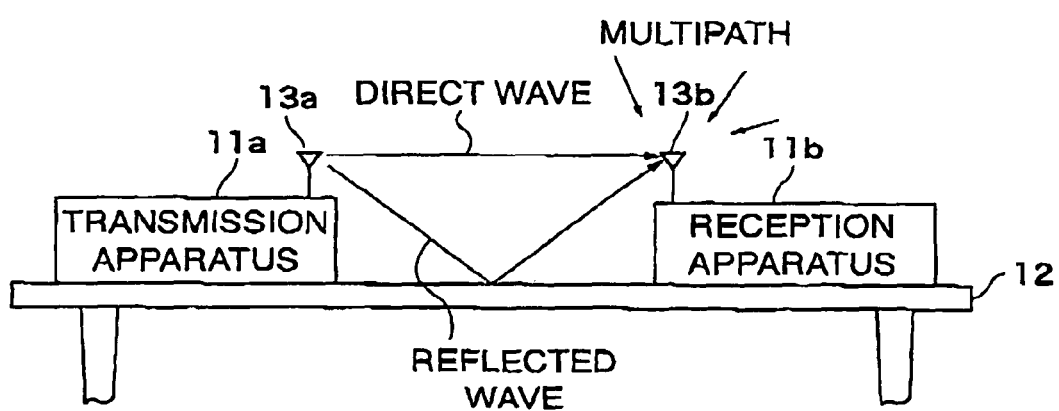
Figure 2:
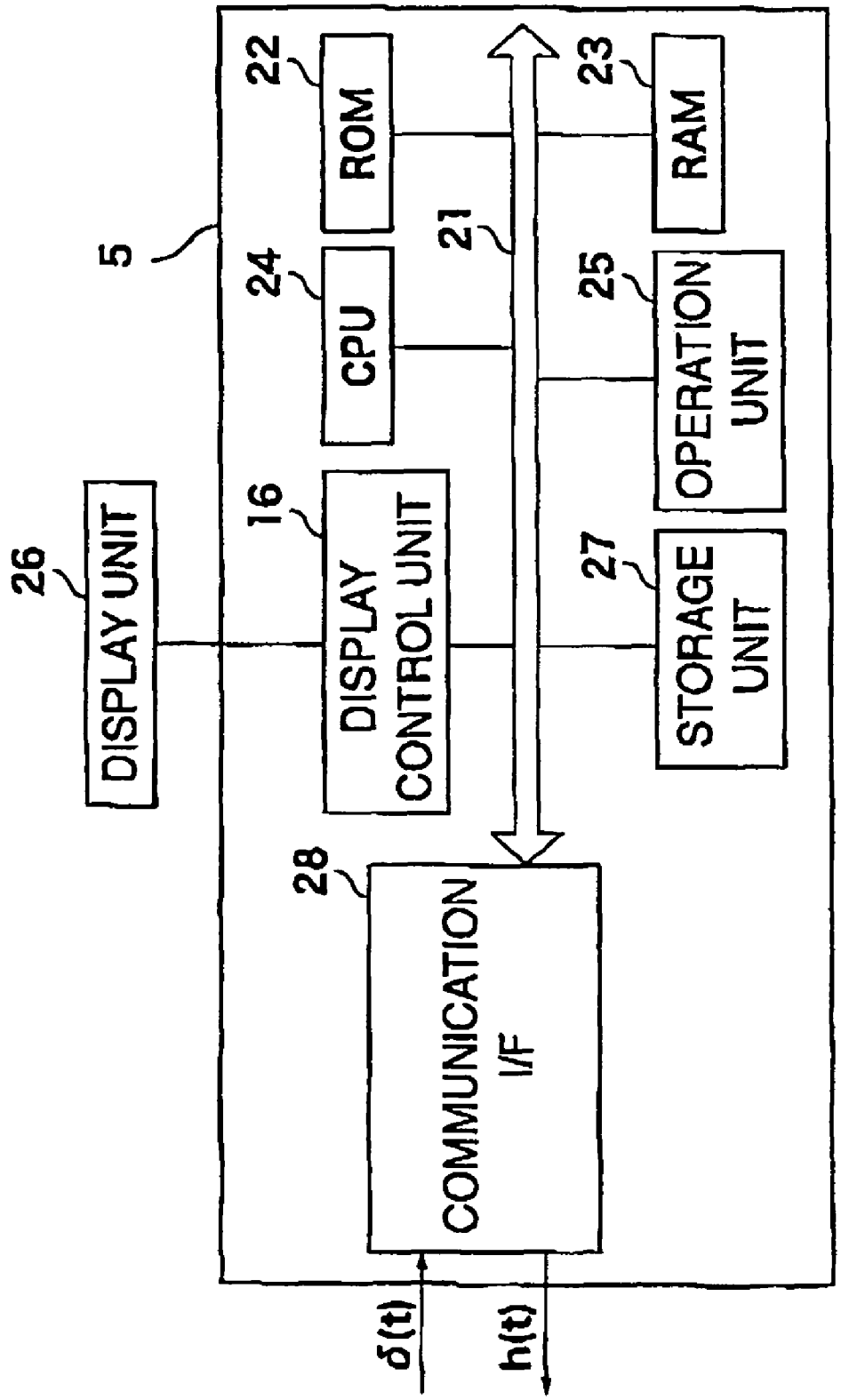
FIG. 2 This is a diagram showing an example of the hardware (emulator) configuration of a pseudo propagation path to which the invention is applied.
Figure 3:
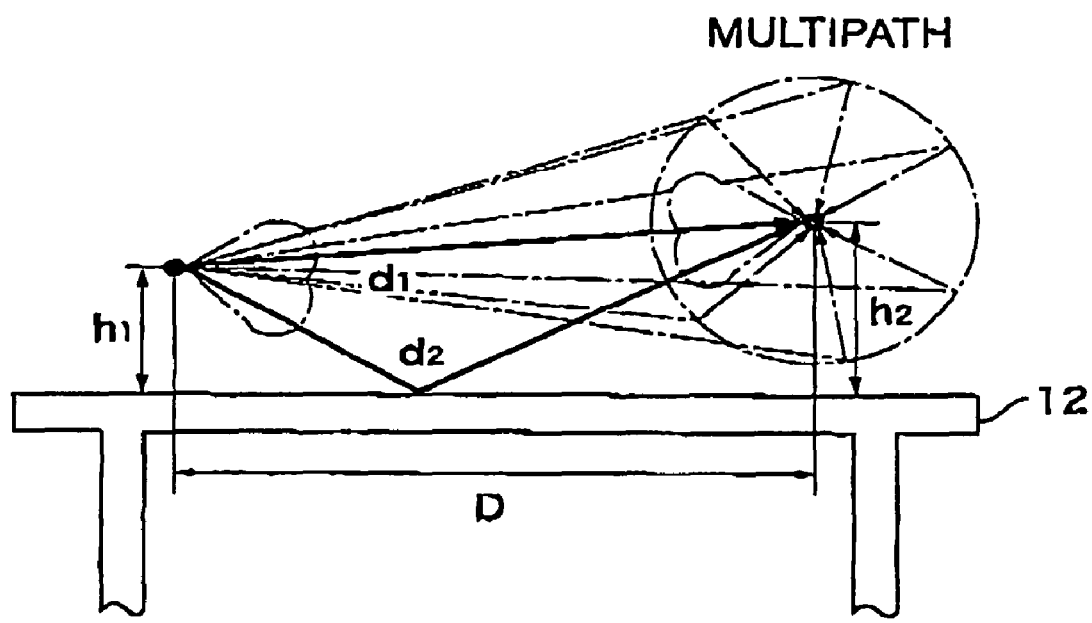
FIG. 3 This is a diagram for explaining an analysis method for the propagation channel characteristic to which the invention is applied.
Figure 4:
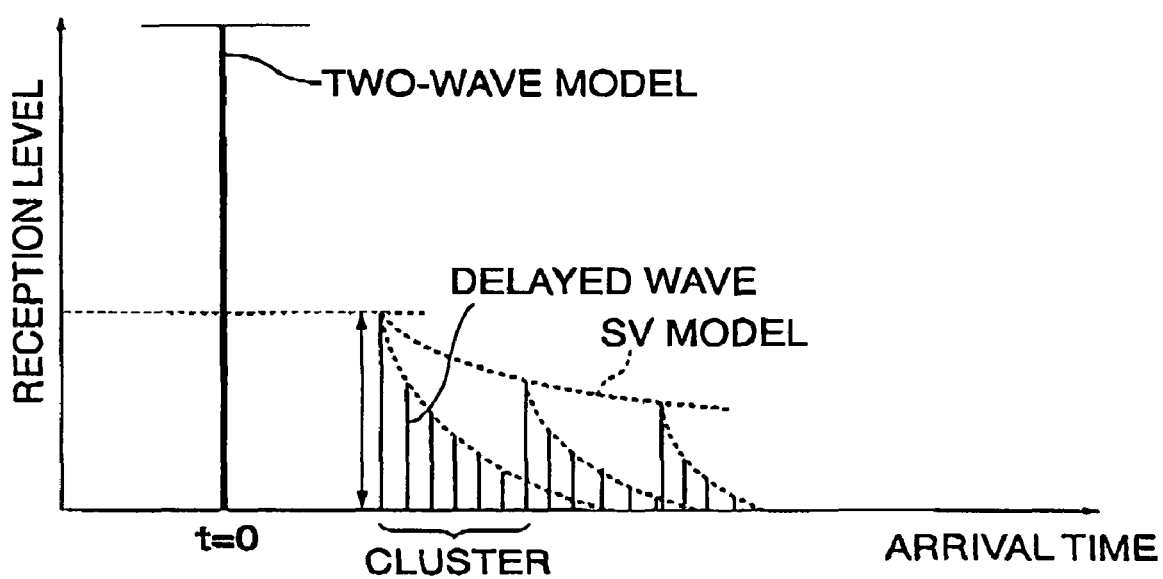
FIG. 4 This is a conceptual diagram of a channel response characteristic expressed an equation (3).
Figure 5:
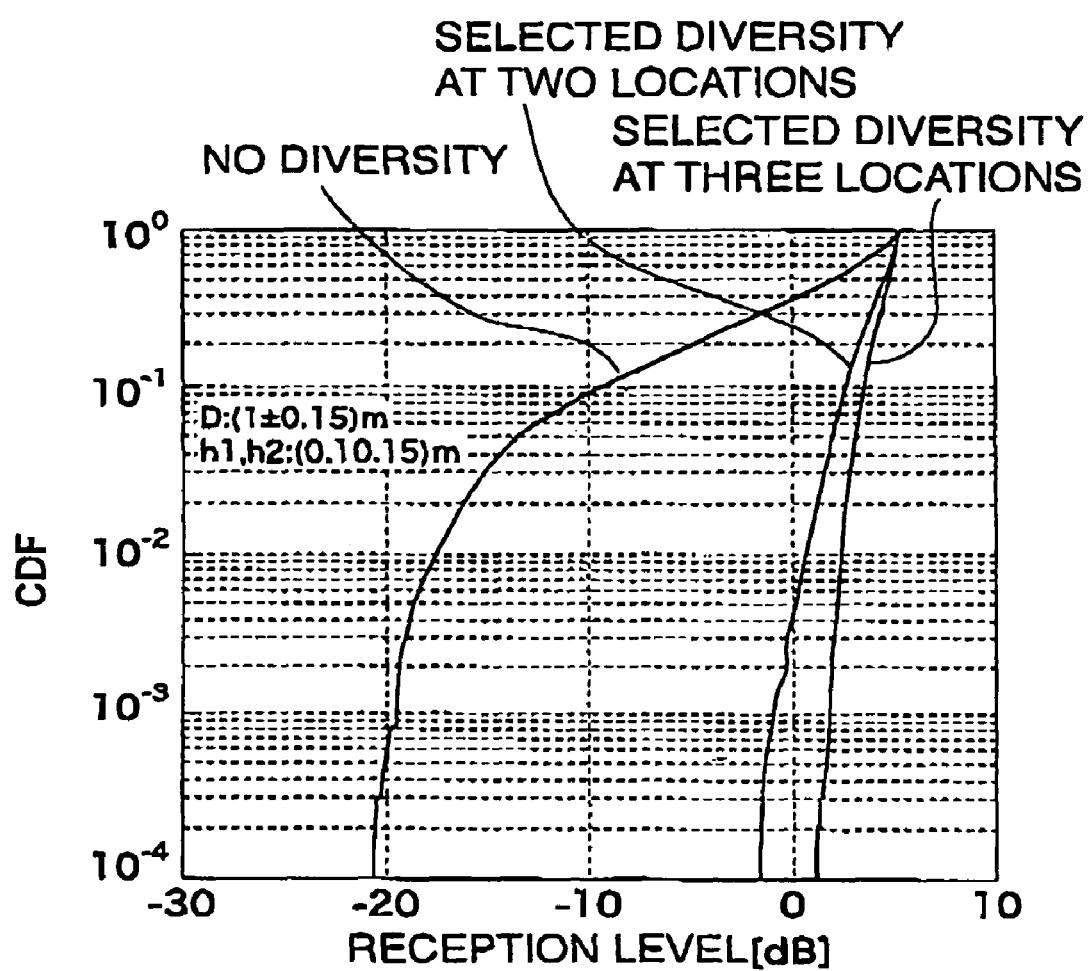
FIG. 5 This is a diagram for graphing CDF of the reception level of a direct wave component.
Figure 6:
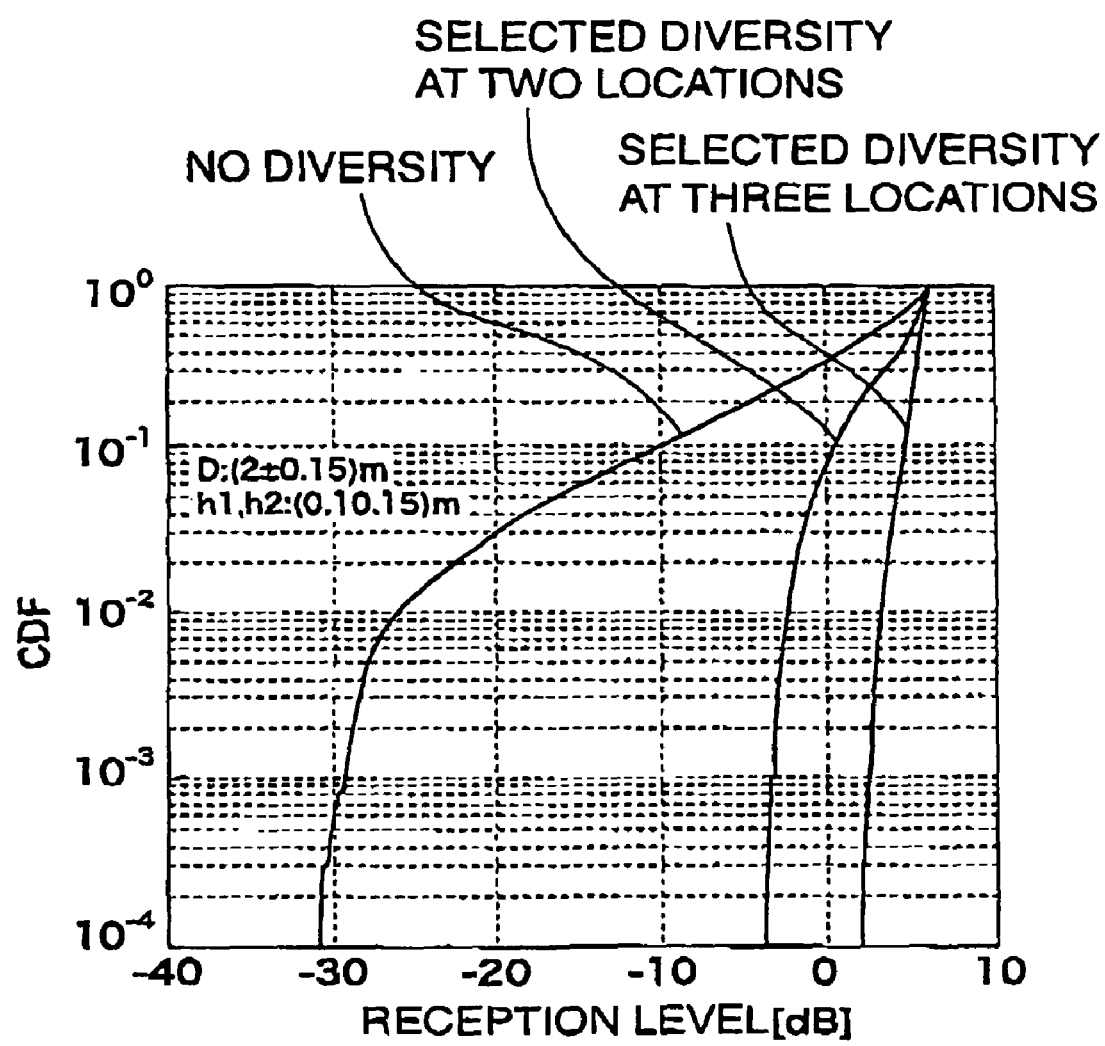
FIG. 6 This is another diagram for graphing CDF of the reception level of the direct wave component.
Figure 7:
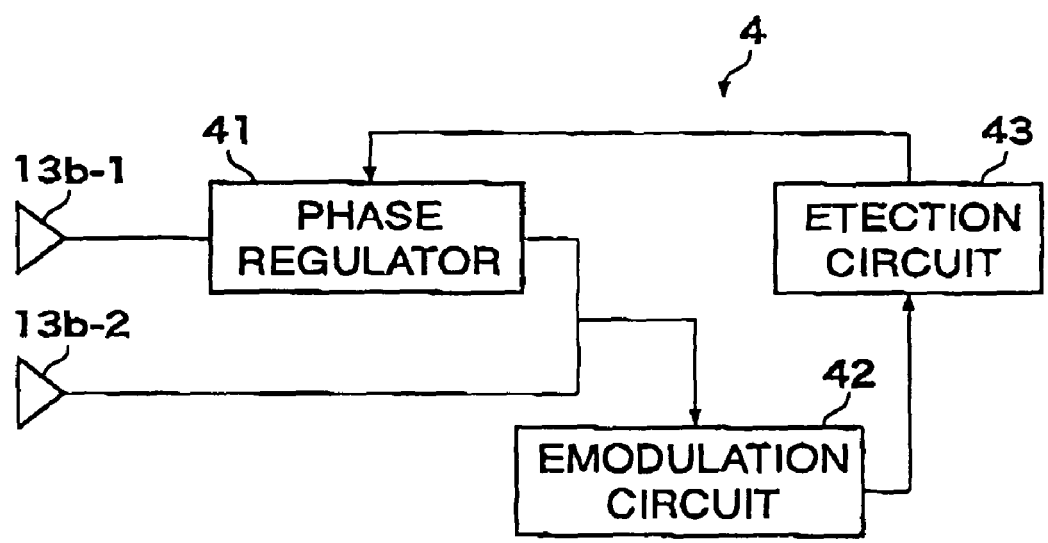
FIG. 7 This is a diagram showing a configuration example for actively changing one of parameters $G_{t1}$, $G_{t2}$, $G_{r1}$, and $G_{r2}$.

DESCRIPTION OF REFERENCE NUMERALS 1 short-distance desktop radio communication system
5 propagation path simulator
11 terminal unit
11a transmission apparatus
11b reception apparatus
12 desk
13a transmission antenna
13b reception antenna
16 display control section
21 internal bus
22 ROM
23 RAM
24 CPU
25 operation section
26 display section
27 storage section
28 communication I/F

The invention claimed is:
1. A millimeter-wave data transmission characteristic analysis apparatus for use with a radio communication system which takes into consideration a propagation channel characteristic when a reception apparatus receives a radio signal of a millimeter wave band, transmitted from a transmission antenna of a transmission apparatus, via a reception antenna, said apparatus comprising:

a computing device that computes h(t) expressed by the following equation (1) as a channel response to the propagation channel characteristic:

$$h(t) = \beta \delta(t) \quad (1)$$

where β is a complex amplitude expressed by the following equation (2), and δ(t) is a Dirac's delta function, $$\beta = \sqrt{\frac{1}{P_{loss}}} \left(\frac{\mu_D}{D}\right) \left| \sqrt{G_{t1} G_{r1}} + \sqrt{G_{t2} G_{r2}} \, \Gamma_0 \exp\left[j \frac{2\pi}{\lambda_f} \frac{2h_1 h_2}{D}\right] \right| \quad (2)$$

where
$G_{ti}$: gain of the transmission antenna in the transmission apparatus (i=1; direct wave, i=2; reflected wave);
$G_{ri}$: gain of the reception antenna in the reception apparatus (i=1; a direct wave, i=2; reflected wave);
D: distance between a transmission antenna and a reception antenna at a time of generating of a channel response;
$\mu_D$: average value of D;
$h_1$: height of the transmission antenna;
$h_2$: height of the reception antenna;
$P_{loss}$: path loss in free space;
$\Gamma_0$: complex reflection coefficient;
$\lambda_f$: wavelength of the radio signal;
and
said computing device respectively handling D, $h_1$, and $h_2$ as mutually independent random variables according to a uniform distribution or a normal distribution, and parameters, such as a distribution range, a center value, an average, and dispersion, are determined based on a usage mode of a target radio communication system.

2. The data transmission characteristic analysis apparatus according to claim 1, wherein the computing device computes h(t) expressed by the following equation (3) as a channel response to a propagation channel characteristic:

$$h(t) = \beta \delta(t) + \sum_{l=0}^{L-1} \sum_{m=0}^{M_l-1} \alpha_{l,m} \delta(t - T_l - \tau_{l,m}) \delta(\varphi - \Psi_l - \psi_{l,m}) \quad (3)$$

where $$\overline{|\alpha_{l,m}|^2} = \Omega_0 e^{-T_l/\Gamma} e^{-\tau_{l,m}/\gamma - k[1-\delta((m)]} \sqrt{G_r(0, \Psi_l + \psi_{l,m})},$$

$$\angle \alpha_{l,m} \propto \text{Uniform}[0, 2\pi)$$

where
l: l-th cluster;
m: m-th delayed wave in the l-th cluster;
L: total number of clusters;
$M_l$: total number of delayed waves in the l-th cluster;
$T_l$: time of arrival of the first delayed wave in the l-th cluster from the transmission apparatus to the reception apparatus;
$\tau_{l,m}$: relative time delay of the m-th delayed wave in the l-th cluster with respect to $T_l$;
$\Omega_0$: average value of a signal strength of the first delayed wave in the l-th cluster;
$\Psi_l$: arrival angle of the first delayed wave in the l-th cluster (which takes any value in a range of 0 to 2π at a probability of a uniform distribution) at the reception antenna;
$\psi_{l,m}$: relative arrival angle of the m-th delayed wave in the l-th cluster at the reception antenna with respect to $\Psi_l$;

Γ: attenuation coefficient of a cluster;
γ: attenuation coefficient of a delayed wave;
k: coefficient expressing a Rician factor in each cluster,
$\sqrt{G_r(0,\Psi_l+\psi_{l,m})}$: gain on a horizontal plane of the reception antenna $\angle\alpha_{l,m} \propto \text{Uniform}[0,2\pi]:/\alpha_{l,m}|$
$\angle\alpha_{l,m}$ taking any value in the range of 0 to $2\pi$ at the probability of a uniform distribution.

3. The millimeter-wave data transmission characteristic analysis apparatus as recited in claim 2, in combination with a millimeter-wave radio communication system wherein a physical configuration or software-based control mechanism of the transmission apparatus or the reception apparatus is adjusted or designed based on a result of computation performed by the millimeter-wave data transmission characteristic analysis apparatus.

4. A millimeter-wave data transmission characteristic analysis apparatus for use with a radio communication system which takes into consideration a propagation channel characteristic when a reception apparatus receives a radio signal of a millimeter wave band, transmitted from a transmission antenna of a transmission apparatus, via a reception antenna, the channel characteristic analysis apparatus comprising:
a computing device that computes h(t) expressed by the following equation (4) as a channel response to the propagation channel characteristic:

$$h(t) = \frac{\lambda_f}{4\pi d_1}\sqrt{G_{t1}G_{r1}}\, e^{-j\frac{2\pi}{\lambda_f}d_1}\delta(t) + \frac{\lambda_f}{4\pi d_2}\sqrt{G_{t2}G_{r2}}\,\Gamma_0 e^{-j\frac{2\pi}{\lambda_f}d_2}\delta(t-\Delta t) \tag{4}$$

where $$d_1 = \sqrt{(h_1 - h_2)^2 + D^2},\; d_2 = \sqrt{(h_1 + h_2)^2 + D^2}$$

where
$G_{ti}$: gain of the transmission antenna in the transmission apparatus (i=1; direct wave, i=2; reflected wave);
$G_{ri}$: gain of the reception antenna in the reception apparatus (i=1; direct wave, i=2; reflected wave);
D: distance between a transmission antenna and a reception antenna at a time of generating of a channel response;
$\mu_D$: average value of D;
$h_1$: height of the transmission antenna;
$h_2$: height of the reception antenna;
$\Gamma_0$: complex reflection coefficient;
$\lambda_f$: wavelength of the radio signal;
k: coefficient expressing a Rician factor in each cluster; and
said computing device respectively handling D, $h_1$, and $h_2$ as mutually independent random variables according to a uniform distribution or a normal distribution, and parameters, such as a distribution range, a center value, an average, and dispersion, are determined based on a usage mode of a target radio communication system.

5. The millimeter-wave data transmission characteristic analysis apparatus as recited in claim 1, in combination with a millimeter-wave radio communication system wherein a physical configuration or software-based control mechanism of the transmission apparatus or the reception apparatus is adjusted or designed based on a result of computation performed by the millimeter-wave data transmission characteristic analysis apparatus.

6. The millimeter-wave data transmission characteristic analysis apparatus as recited in claim 4, in combination with a millimeter-wave radio communication system wherein a physical configuration or software-based control mechanism of the transmission apparatus or the reception apparatus is adjusted or designed based on a result of computation performed by the millimeter-wave data transmission characteristic analysis apparatus.

7. A data transmission characteristic analysis method for use with a radio communication system, said method taking into consideration a propagation channel characteristic when a reception apparatus receives a radio signal of a millimeter wave band, transmitted from a transmission antenna of a transmission apparatus, via a reception antenna, said method comprising:
a computation step of computing h(t) expressed by the following equation (1) as a channel response to the propagation channel characteristic:

$$h(t)=\beta\delta(t) \tag{1}$$

where β is a complex amplitude expressed by the following equation (2), and δ(t) is a Dirac's delta function, $$\beta = \sqrt{\frac{1}{P_{loss}}}\left(\frac{\mu_D}{D}\right)\left|\sqrt{G_{t1}G_{r1}} + \sqrt{G_{t2}G_{r2}}\,\Gamma_0\exp\left[j\frac{2\pi}{\lambda_f}\frac{2h_1h_2}{D}\right]\right| \tag{2}$$

where
$G_{ti}$: gain of the transmission antenna in the transmission apparatus (i=1; direct wave, i=2; reflected wave);
$G_{ri}$: gain of the reception antenna in the reception apparatus (i=1; direct wave, i=2; reflected wave);
D: distance between a transmission antenna and a reception antenna at a time of generating of a channel response;
$\mu_D$: average value of D;
$h_1$: height of the transmission antenna;
$h_2$: height of the reception antenna;
$P_{loss}$: path loss in free space;
$\Gamma_0$: complex reflection coefficient;
$\lambda_f$: wavelength of the radio signal;
and
said method further including respectively handling D, $h_1$, and $h_2$ as mutually independent random variables according to a uniform distribution or a normal distribution, and parameters, such as a distribution range, a center value, an average, and dispersion, are determined based on a usage mode of a target radio communication system.

8. The data transmission characteristic analysis method according to claim 7, wherein in the computation step, h(t) expressed by the following equation (3) is computed as a channel response to a propagation channel characteristic:

$$h(t) = \beta\delta(t) + \sum_{l=0}^{L-1}\sum_{m=0}^{M_l-1}\alpha_{l,m}\delta(t - T_l - \tau_{l,m})\delta(\varphi - \Psi_l - \psi_{l,m}) \tag{3}$$

where $$|\alpha_{l,m}|^2 = \Omega_0 e^{-T_l/\Gamma}e^{-\tau_{l,m}/\gamma - k[1-\delta(m)]}\sqrt{G_p(0, \Psi_l + \psi_{l,m})},$$

$$\angle\alpha_{l,m} \propto \text{Uniform}[0, 2\pi)$$

where
l: l-th cluster;
m: m-th delayed wave in the l-th cluster;
L: total number of clusters;

$M_l$: total number of delayed waves in the l-th cluster;

$T_l$: time of arrival of the first delayed wave in the l-th cluster from the transmission apparatus to the reception apparatus;

$\tau_{l,m}$: relative time delay of the m-th delayed wave in the l-th cluster with respect to $T_l$;

$\Omega_0$: average value of a signal strength of the first delayed wave in the l-th cluster;

$\Psi_l$: arrival angle of the first delayed wave in the l-th cluster (which takes any value in a range of 0 to $2\pi$ at a probability of a uniform distribution) at the reception antenna;

$\Psi_{l,m}$: relative arrival angle of the m-th delayed wave in the l-th cluster at the reception antenna with respect to $\Psi_l$;

$\Gamma$: attenuation coefficient of a cluster;

$\gamma$: attenuation coefficient of a delayed wave;

k: coefficient expressing a Rician factor in each cluster, $\sqrt{G_r(0,\Psi_l+\psi_{l,m})}$: gain on a horizontal plane of the reception antenna $\angle \alpha_{l,m} \propto \text{Uniform}[0,2\pi)\text{:/}\alpha_{l,m}]$ $\angle \alpha_{l,m}$ taking any value in the range of 0 to $2\pi$ at the probability of a uniform distribution.

9. A data transmission characteristic analysis method for use with a radio communication system which takes into consideration a propagation channel characteristic when a reception apparatus receives a radio signal of a millimeter wave band, transmitted from a transmission antenna of a transmission apparatus, via a reception antenna, said method comprising:

a computation step of computing h(t) expressed by the following equation (4) as a channel response to the propagation channel characteristic:

$$h(t) = \frac{\lambda_f}{4\pi d_1}\sqrt{G_{t1}G_{r1}}\, e^{-j\frac{2\pi}{\lambda_f}d_1}\delta(t) + \frac{\lambda_f}{4\pi d_2}\sqrt{G_{t2}G_{r2}}\,\Gamma_0 e^{-j\frac{2\pi}{\lambda_f}d_2}\delta(t-\Delta t) \quad (4)$$

where $d_1 = \sqrt{(h_1-h_2)^2 + D^2}$, $d_2 = \sqrt{(h_1+h_2)^2 + D^2}$ where $G_{ti}$: gain of the transmission antenna in the transmission apparatus (i=1; direct wave, i=2; reflected wave);

$G_{ri}$: gain of the reception antenna in the reception apparatus (i=1; direct wave, i=2; reflected wave);

D: distance between a transmission antenna and a reception antenna at a time of generating of a channel response;

$\mu_D$: average value of D;

$h_1$: height of the transmission antenna;

$h_2$: height of the reception antenna;

$\Gamma_0$: complex reflection coefficient;

$\lambda_f$: wavelength of the radio signal;

k: coefficient expressing a Rician factor in each cluster; and said method further including respectively handling D, $h_1$, and $h_2$ as mutually independent random variables according to a uniform distribution or a normal distribution, and parameters, such as a distribution range, a center value, an average, and dispersion, are determined based on a usage mode of a target radio communication system.

10. A program stored on a computer readable medium which allows a computer to execute simulation or emulation of a propagation channel characteristic when a reception apparatus receives a radio signal of a millimeter wave band, transmitted from a transmission antenna of a transmission apparatus, via a reception antenna, the program as stored on the computer readable medium comprising computer code that allows the computer to execute:

a computation step of computing h(t) expressed by the following equation (1) as a channel response to the propagation channel characteristic, $$h(t) = \beta\delta(t) \quad (1)$$

where $\beta$ is a complex amplitude expressed by the following equation (2), and $\delta(t)$ is a Dirac's delta function, $$\beta = \sqrt{\frac{1}{P_{loss}}}\left(\frac{\mu_D}{D}\right)\left|\sqrt{G_{t1}G_{r1}} + \sqrt{G_{t2}G_{r2}}\,\Gamma_0\exp\left[j\frac{2\pi}{\lambda_f}\frac{2h_1 h_2}{D}\right]\right| \quad (2)$$

where $G_{ti}$: gain of the transmission antenna in the transmission apparatus (i=1; direct wave, i=2; reflected wave);

$G_{ri}$: gain of the reception antenna in the reception apparatus (i=1; direct wave, i=2; reflected wave);

D: distance between a transmission antenna and a reception antenna at a time of generating of a channel response;

$\mu_D$: average value of D;

$h_1$: height of the transmission antenna;

$h_2$: height of the reception antenna;

$P_{loss}$: path loss in free space;

$\Gamma_0$: complex reflection coefficient;

$\lambda_f$: wavelength of the radio signal;

and said program respectively handling D, $h_1$, and $h_2$ as mutually independent random variables according to a uniform distribution or a normal distribution, and parameters, such as a distribution range, a center value, an average, and dispersion, are determined based on a usage mode of a target radio communication system.

11. The program stored on said computer readable medium according to claim 10, wherein in the computation step, h(t) expressed by the following equation (3) is computed as a channel response to a propagation channel characteristic, $$h(t) = \beta\delta(t) + \sum_{l=0}^{L-1}\sum_{m=0}^{M_l-1}\alpha_{l,m}\delta(t-T_l-\tau_{l,m})\delta(\varphi-\Psi_l-\psi_{l,m}) \quad (3)$$

where $\overline{|\alpha_{l,m}|^2} = \Omega_0 e^{-T_l/\Gamma} e^{-\tau_{l,m}/\gamma-k[1-\delta(m)]}\sqrt{G_p(0,\Psi_l+\psi_{l,m})}$, $\angle \alpha_{l,m} \propto \text{Uniform}[0, 2\pi)$ where l: l-th cluster;

m: m-th delayed wave in the l-th cluster;

L: total number of clusters;

$M_l$: total number of delayed waves in the l-th cluster;

$T_l$: time of arrival of the first delayed wave in the l-th cluster from the transmission apparatus to the reception apparatus;

$\tau_{l,m}$: relative time delay of the m-th delayed wave in the l-th cluster with respect to $T_l$;

$\Omega_0$: average value of a signal strength of the first delayed wave in the l-th cluster;

$\Psi_l$: arrival angle of the first delayed wave in the l-th cluster (which takes any value in a range of 0 to $2\pi$ at a probability of a uniform distribution) at the reception antenna;

$\Psi_{l,m}$: relative arrival angle of the m-th delayed wave in the l-th cluster at the reception antenna with respect to $\Psi_l$;
Γ: attenuation coefficient of a cluster;
γ: attenuation coefficient of a delayed wave;
k: coefficient expressing a Rician factor in each cluster,
$\sqrt{G_r(0,\Psi_l+\psi_{l,m})}$: gain on a horizontal plane of the reception antenna $\angle\alpha_{l,m}\propto$Uniform$[0,2\pi)/\alpha_{l,m}$1
$\angle\alpha_{l,m}$ taking any value in the range of 0 to $2\pi$ at the probability of a uniform distribution.

12. A program stored on a computer readable medium which allows a computer to execute simulation or emulation of a propagation channel characteristic when a reception apparatus receives a radio signal of a millimeter wave band, transmitted from a transmission antenna of a transmission apparatus, via a reception antenna, the program as stored on said computer readable medium comprising computer code that allows the computer to execute:

a computation step of computing h(t) expressed by the following equation (4) as a channel response to the propagation channel characteristic, $$h(t) = \frac{\lambda_f}{4\pi d_1}\sqrt{G_{t1}G_{r1}}\,e^{-j\frac{2\pi}{\lambda_f}d_1}\delta(t) + \frac{\lambda_f}{4\pi d_2}\sqrt{G_{t2}G_{r2}}\,\Gamma_0 e^{-j\frac{2\pi}{\lambda_f}d_2}\delta(t-\Delta t) \quad (4)$$

where $$d_1 = \sqrt{(h_1-h_2)^2 + D^2},\ d_2 = \sqrt{(h_1+h_2)^2 + D^2}$$

where
$G_{ti}$: gain of the transmission antenna in the transmission apparatus (i=1; direct wave, i=2; reflected wave);
$G_{ri}$: gain of the reception antenna in the reception apparatus (i=1; direct wave, i=2; reflected wave);
D: distance between a transmission antenna and a reception antenna at a time of generating of a channel response;
$\mu_D$: average value of D;
$h_1$: height of the transmission antenna;
$h_2$: height of the reception antenna;
$\Gamma_0$: complex reflection coefficient;
$\lambda_f$: wavelength of the radio signal;
k: coefficient expressing a Rician factor in each cluster; and
said program respectively handling D, $h_1$, and $h_2$ as mutually independent random variables according to a uniform distribution or a normal distribution, and parameters, such as a distribution range, a center value, an average, and dispersion, are determined based on a usage mode of a target radio communication system.

* * * * *